Nov. 1, 1955   E. A. FREUND   2,722,038
PROCESS FOR PRINTING ON PLASTIC MATERIALS
Filed Sept. 11, 1948
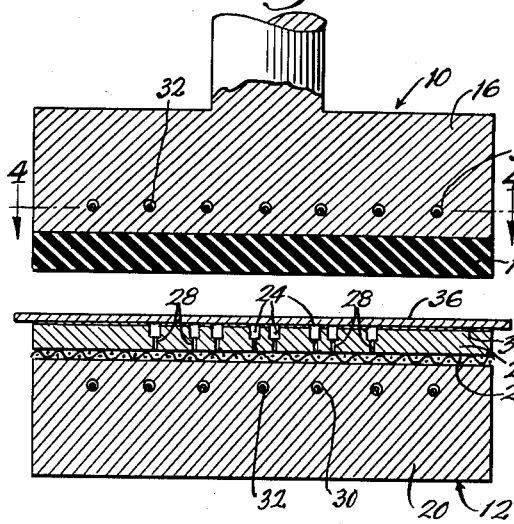
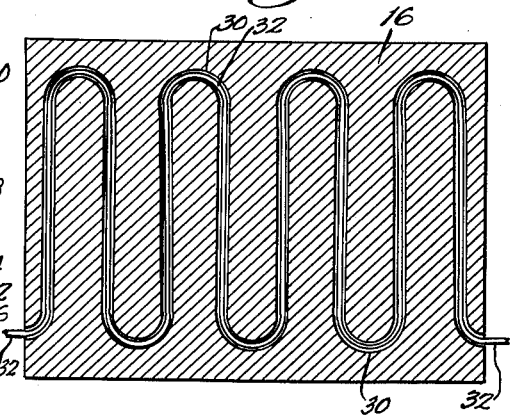
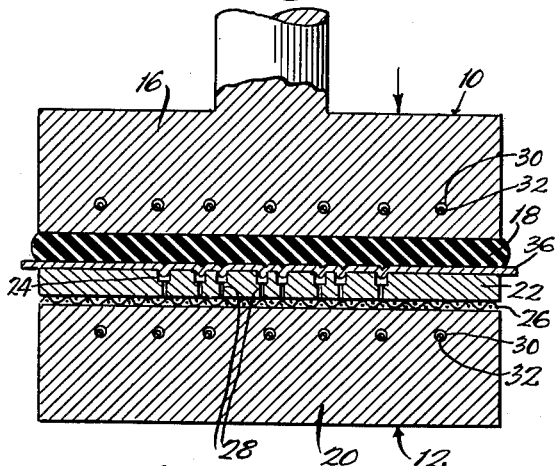
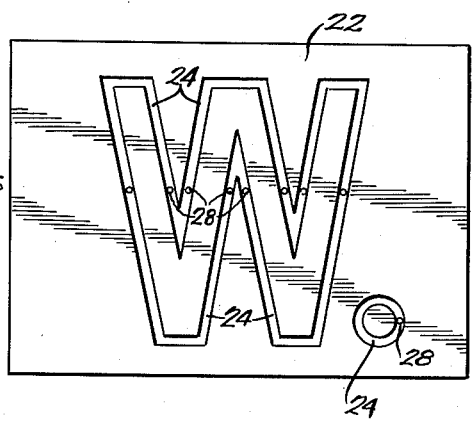
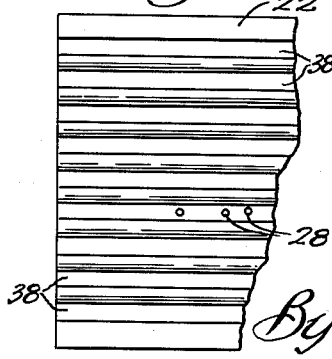
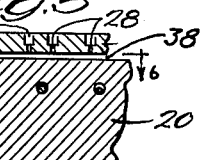
Inventor:
Erich A. Freund,
By Dawson, Ooms, Brothers Spangenberg,
Attorneys

United States Patent Office 2,722,038
Patented Nov. 1, 1955

2,722,038

PROCESS FOR PRINTING ON PLASTIC MATERIALS

Erich A. Freund, Chicago, Ill.

Application September 11, 1948, Serial No. 48,834

6 Claims. (Cl. 18—48)

My invention relates to an improved process for printing on plastic materials which is simultaneously capable of embossing and press polishing the same.

Plastic sheets present smooth, dense, surfaces less capable of absorbing ink than the porous surface formed by fibers of paper, cloth and other materials. Moreover, these sheets are generally transparent or translucent and thus require a considerable penetration of ink to achieve attractive printing. For these reasons conventional printing processes are incapable of achieving the uniform, complete, and deep ink coverage necessary for attractive printing on plastics.

In accordance with the present invention, ornamental designs, letters, or the like are printed on plastic materials in a manner whereby complete transfer of ink takes place from the plate to the sheet and the ink penetrates into the surface of the plastic material. Moreover, this printing is achieved under heat and pressure and may be used simultaneously to emboss the plastic and press polish the printed image on the plastic sheets while printing. In this manner the surface texture of the printed portion of the plastic sheet is made in any desired form and the printed portions emphasized by the embossed surfaces.

It is accordingly a general object of the present invention to provide an improved method of and means for printing on plastic materials in which complete ink transfer is obtained.

Another object of the present invention is to provide an improved method of and means for printing on plastic materials which imparts thereto a new and distinctive appearance not heretofore achieved.

Further it is an object of the present invention to provide an improved method of and means for printing on plastic materials and which is capable of simultaneously embossing and press polishing that material.

A further and more specific object of the present invention is to provide an improved method of and apparatus for printing and embossing on a plastic material and which does not tend to blister the plastic.

Yet another object of the present invention is to provide an improved method of and means for printing on plastic material and which results in substantial penetration of the ink into the material, thereby giving an appearance of body and depth to the printing.

My invention further resides in features of combination and arrangement whereby an improved method of simultaneously embossing, printing, and press-finishing a plastic material is provided and in which a neat, attractive, and impressive appearance is imparted to the plastic material.

The novel features which I believe to be characteristic of my invention are set forth with particularity in the appended claims. My invention, itself, however, will best be understood from the following description taken in connection with the accompanying claims, in which:

Figure 1 is a cross-sectional view of an embossing press constructed in accordance with the features of the present invention;

Figure 2 is a view like Figure 1 but with the press in the closed condition, and Figure 3 is a top plan view of the embossing plate of the apparatus of Figures 1 and 2;

Figure 4 is a cross-sectional view through the axis 4—4, Figure 1;

Figure 5 is a fragmentary cross-sectional view showing an alternative embodiment of the present invention; and Figure 6 is a cross-sectional view through axis 6—6, Figure 5.

The principles of the present invention can best be understood by reference to Figures 1 and 2 which show an embossing press in the open and closed positions respectively. As indicated, the press includes a top platen 10 and a bottom platen 12 mounted upon suitable mechanism (not shown) for opening and closing movements. A sheet of plastic material 36 is interposed between these platens to be printed and embossed upon closure thereof.

The top platen 10 comprises a backing portion 16 upon which is mounted the facing 18. The latter is of rubber or similar resilient material to impart uniform pressure to the bottom platen when pressure is exerted between the top platen 10 and the bottom platen 12.

The bottom platen 12 comprises a backing member 20 and an embossing plate 22, the latter having a plurality of embossing grooves 24. As is best seen in Figure 3, the grooves 24 define an artistic figure, lettering, or the like.

A meshed member 26 is interposed between the backing 20 and the embossing plate 22. This member may, for example, consist of ordinary copper wire screening. Channels 28 extend from the grooves 24 to the back surface of the embossing plate 22 and hence are in communication with the meshed member 26 which forms a vent between these channels and the atmosphere.

By the term "meshed material" herein I intend to designate any material having channels in both directions to release from one face gases applied to a face at right angles thereto.

The backing portions 16 and 20 of the top and bottom platen members 10 and 12, respectively, are heated by suitable electric heating elements positioned therein. The construction of these elements is best seen in the cross-sectional view of Figure 4 where a serpentine groove 30 receives the heating element 32. The latter element may, for example, comprise a lengthy coil of nickel-chromium resistance wire. Suitable electrical connections (not shown) are provided to supply electric current to the heater element as required.

It will be apparent that the platens may be heated by steam, gas, or other means if desired.

In the operation of the mechanism of the present invention, the flat surface of the embossing plate 22 is covered with the special ink hereinafter described as indicated at 34, Figure 1. A sheet of plastic material 36, such as cellulose acetate, is then placed between the platens and the platens pressed together as indicated in Figure 2. This bends the sheet 36 into the grooves 24 as indicated in Figure 2 to receive embossing. Simultaneously the ink 34 transfers to the unembossed portions of the plastic and the plastic printed image is press-finished in accord with the finish on the embossing plate 22.

During the foregoing operation, the platens 10 and 12 are heated by the electric heaters provided for this purpose to a temperature within the plastic temperature range of the plastic sheet 36. In the case of cellulose acetate, as well as most practical thermo-plastic materials, this temperature range is between 200 and 300 degrees Fahrenheit, approximately.

Having generally described the apparatus of the present invention and the process thereof, I will now describe in further detail the various materials used therein.

The plastic sheet 36 may be any of the various thermoplastic materials that may be heated to permit embossing under the applied pressure. Such materials include cellulose nitrate, cellulose acetate, acetate butyrate, Vinylite, and polystyrene, although other materials may be used. The sheet may be opaque or transparent and, if desired, may be colored.

The ink 34 may, for example, comprise 195 parts of carbon black to 75 parts of chinese blue and 745 parts of vehicle. The vehicle, in turn, may be a nitrocellulose base in di-ethyl phtalate as solvent and plasticized with di-butyl phtalate and castor oil fatty acid alkyd. Other inks containing solvents capable of superficially penetrating the material being treated may be used although the above ink has been found particularly suitable for use with cellulose nitrate plastic sheets.

In accordance with the present invention a small amount of separating compound is added to the ink 34. Materials that may be used for this purpose include paraffin, waxes, and all fatty acids, including particularly, linseed oil fatty acid. Other less desirable compounds include castor oil, silicones, and ethyl cellulose.

The purpose of the separating compound is to achieve a complete transfer of ink from the embossing plate 22 to the plastic sheet. When a sufficient amount of this material is contained in the ink, complete transfer is obtained without leaving any residue on the plate 22 and the print is unusually opaque. While the mode of operation of these materials is not entirely understood, the amount required for successful operation can easily be determined by adding a small amount at a time to a definite quantity of ink under preparation until satisfactory transfer is achieved.

The embossing plate 22 may be a relief plate of the type produced by the process of photo-engraving. Zinc, copper, brass, steel, and similar materials are satisfactory. In the event copper or brass plates are used it is desirable to plate them with nickel, chromium, or some other white metal to avoid the tendency of the ink to "burn-in" and adhere firmly to the plate.

The process of the present invention involves release of vapors. It has been discovered that these vapors cause blistering of the plastic with a resultant lack of uniformity of the product and objectionable appearance thereof. The escape channels 28, Figures 2 and 3, have been found to avoid this problem without leaving objectionable marks on the plastic material.

The escape channels are positioned at various points along the embossing grooves 24. I have found that the position of these channels can most effectively be determined by running trial sheets through the mechanism and drilling suitable holes adjacent the points where blisters appear. This procedure is made possible by the ability of screen 26 to vent all such openings irrespective of their location.

The press-polishing of the printed image is believed to result from the pressure exerted by the heated plastic against the embossing plate which causes the former to partake of the surface texture of the latter. If a high luster is desired to be imparted to the printed image, the surface of this plate should be highly polished. On the other hand, if a mottled surface is desired, a correspondingly mottled surface must be provided on the plate. Other surfaces may similarly be achieved.

The apparatus and process of the present invention produces a hard printed image with good ink coverage and line definition emphasized by the embossing and press-polishing imparted to the plastic.

The apparatus and process of the present invention may be used to print, emboss, and press-polish plastic coated papers, laminated materials faced with plastic materials, metallized plastic sheets and the like. Moreover, a metal or like backing having a permanent temperature sensitive adhesive may be simultaneously applied.

It will, of course, be apparent that the platens 10 and 12 may in fact be in the form of mating cylinders or other curved surfaces without altering the operation of the present invention. I have accordingly used the term "platen" in the appended claims to cover not only flat platen members but also platen-like members formed in the shape of cylinders or other curved surfaces.

Figures 5 and 6 are fragmentary cross-sectional views of an alternative embodiment of the present invention showing a further method of venting gases from the plate 22. As indicated, this plate itself is provided with a plurality of parallel grooves 38 which coact with the surface of backing member 20 to define channels from which gases in channels 28 can escape.

If desired, the rubber or resilient material 18 may be replaced by a material capable of setting or freezing under heat and pressure to conform on its exposed surface to the shape of plate 22, thus defining a mating relief surface for coaction with that plate.

The resilience of the material 18 or the shape of a setting material pressed to conform to plate 22, tends to equalize the pressure against the printing surfaces, thereby minimizing the "make ready" operation essential to typographic or relief printing and saving time otherwise consumed in that operation.

The method and apparatus of the present invention may be used with plastic surfaces of various kinds such as, for example, molded plastic surfaces. Moreover, it may be used with laminated materials or metal foil having a plastic surface. In addition, the operation of the present invention may be made to achieve laminating effects by placing the materials to be joined between the platens with a suitable temperature and pressure sensitive adhesive. In this fashion a sheet comprising a metal foil carrying a suitably printed plastic surface may be made in a single operation.

The process of the present invention enables two-color printing and embossing on transparent or translucent plastic or like materials without the need for registering and in a one step operation.

This is accomplished by affixing a backing of bright metal or other desired color at the same time the printing is applied, thus causing the color of the backing to be seen through the embossed or unprinted portions of the plastic. Three or more colors may be achieved without registering by using several backing materials over different areas of the sheet.

It should further be noted that in the process and apparatus of the present invention, letter type printing on plastics has been successfully achieved without the disadvantages heretofore attendant the application of this form of printing to such materials.

By the term plastic herein I intend to cover generically all substances capable of cooperating with the solvent of the ink to achieve a superficial penetration of the material capable of anchoring the ink constituting the printed image and giving an appearance of depth to the same. Of course the chemical constituency of the ink is varied in accord with the plastic material upon which the printing is desired and, if necessary, specific solvents added to the standard solvents in the ink to achieve the requisite degree of penetration.

It will, of course, be understood that the various elements of the structure here shown may be reversed or transposed if desired. Thus, for example, the plate 22, Figure 1, may be affixed to the top platen 10 and the cushion 18 to the bottom platen 12, the screen 26 being then interposed between backing member 16 and the plate 22.

In a practical embodiment of the present invention it is desirable to provide temperature and pressure control elements to hold the temperature of the platens and the pressure exerted on the plastic within the limits of optimum operation. These limits must, of course, be correlated with the time period the plastic is under treatment. Moreover, suitable heat insulating and conducting members may be included in the apparatus to assure a high degree of uniformity of temperature over the surface of the platens.

In addition to the materials heretofore mentioned, the plate 22 might be made of a phenolic resin, ceramic, or similar material having small affinity for the ink.

Designs to be printed and embossed in accord with the present invention should be planned to permit maximum use of common vapor escape channels 28 for various parts of the plate 22. This reduces the amount of drilling required and minimizes the problems encountered when it is necessary to vent very narrow grooves on the plate.

In the appended claims I have used the term platen to designate the complete assembly by which printing and embossing is achieved, including in particular the plate 22, Figures 1 and 2.

If it is desired to print on the plastic material without embossing the same, the temperature of the platens is preferably maintained at a value somewhat below the softening temperature of the material and the resilient member 18 is preferably replaced with a rigid member to minimize the tendency of the plastic to be embossed.

The process and apparatus of the present invention may be used to die-cut the plastic sheets simultaneously with the printing operation, particularly if a relatively low temperature is used.

The method, apparatus, and ink of the present invention is particularly useful in printing ornamental designs on jewelry boxes and similar devices where a neat and attractive appearance is particularly desirable.

While I have shown and described particular embodiments of the present invention, it will be, of course, understood that various modifications may be made without departing from the spirit and scope thereof. I therefore intend by the appended claims to cover all such modifications and alternative constructions as fall within the true spirit and scope of my invention.

What I claim as new and desire to secure by Letters Patent of the United States is:

1. The method of printing on a thermoplastic material, which comprises heating a sheet of the thermoplastic material to a temperature in the plastic temperature range of said sheet while pressing a heated printing plate coated with ink against one surface of said sheet, said ink containing a separating compound consisting of a material selected from the group consisting of paraffin, waxes, and fatty acids, in an amount sufficient to produce a substantially complete transfer of ink from said printing plate to said sheet at every impression, whereby said ink is prevented from baking on said plate and a precise image definition is continually obtained.

2. The method of printing on a thermoplastic material, which comprises heating a sheet of the thermoplastic material to a temperature in the plastic temperature range of said sheet while pressing a heated printing plate coated with ink against one surface of said sheet, said ink containing a paraffin separating compound, in an amount sufficient to produce a substantially complete transfer of ink from said printing plate to said sheet at every impression, whereby said ink is prevented from baking on said plate and a precise image definition is continually obtained.

3. The method of printing on a thermoplastic material, which comprises heating a sheet of the thermoplastic material to a temperature in the plastic temperature range of said sheet while pressing a heated printing plate coated with ink against one surface of said sheet, said ink containing a fatty acid separating compound, in an amount sufficient to produce a substantially complete transfer of ink from said printing plate to said sheet at every impression, whereby said ink is prevented from baking on said plate and a precise image definition is continually obtained.

4. The method of printing on a thermoplastic material, which comprises heating a sheet of the thermoplastic material to a temperature in the plastic temperature range of said sheet while pressing a heated printing plate coated with ink against one surface of said sheet, said ink containing a wax separating compound, in an amount sufficient to produce a substantially complete transfer of ink from said printing plate to said sheet at every impression, whereby said ink is prevented from baking on said plate and a precise image definition is continually obtained.

5. The process of claim 1 in which said thermoplastic sheet is composed of cellulose nitrate and in which said ink contains a vehicle with a nitrocellulose base.

6. The method of printing and simultaneously press-polishing a thermoplastic material, which comprises heating a sheet of the thermoplastic material to a temperature in the plastic temperature range of said sheet and between about 200° F. to 300° F. while pressing a heated printing plate against one surface of said sheet, said printing plate having one portion thereof coated with ink and another portion thereof being ink-free and providing a highly polished surface, said ink containing a separating compound consisting of a material selected from the group consisting of paraffin, waxes, and fatty acids in an amount sufficient to produce a substantially complete transfer of ink from the inked portion of said printing plate to said sheet at every impression, whereby said ink is prevented from baking on said plate and a precise image definition is continually obtained and the portion of said sheet surrounding said image is given a high polish.

References Cited in the file of this patent

UNITED STATES PATENTS

| Number | Name | Date |
|---|---|---|
| 348,222 | Lefferts | Aug. 31, 1886 |
| 409,345 | Brady | Aug. 20, 1889 |
| 1,422,695 | Goldenbaum | July 11, 1922 |
| 1,844,861 | Mason | Feb. 9, 1932 |
| 2,191,603 | Whitner | Feb. 27, 1940 |
| 2,213,126 | Jones | Aug. 27, 1940 |
| 2,250,958 | Kautter | July 29, 1941 |
| 2,254,072 | Jenkins | Aug. 26, 1941 |
| 2,267,372 | Calkins | Dec. 23, 1941 |
| 2,404,073 | Karfiol | July 16, 1946 |
| 2,422,148 | Uhlig | June 10, 1947 |

FOREIGN PATENTS

| Number | Country | Date |
|---|---|---|
| 337,199 | Great Britain | Oct. 30, 1930 |
| 526,853 | Great Britain | Sept. 26, 1940 |

OTHER REFERENCES

C. Ellis, Printing Inks, pages 116 and 494; Reinolds Publication Company, 330 W. 42nd Street, New York, N. Y., 1940.